US 7,424,668 B2

(12) United States Patent
DeSpain

(10) Patent No.: US 7,424,668 B2
(45) Date of Patent: Sep. 9, 2008

(54) PRE-FORMULATED SPREADSHEET CELL GROUPS

(75) Inventor: Stuart N. DeSpain, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 375 days.

(21) Appl. No.: 11/153,504

(22) Filed: Jun. 15, 2005

(65) Prior Publication Data
US 2006/0288267 A1 Dec. 21, 2006

(51) Int. Cl.
*G06F 17/00* (2006.01)
(52) U.S. Cl. .................................................. 715/212
(58) Field of Classification Search ................ 715/503, 715/504, 217, 212, 220, 213
See application file for complete search history.

(56) References Cited

U.S. PATENT DOCUMENTS

| 6,293,868 B1 * | 9/2001 | Bernard ........................ 463/42 |
| 6,418,400 B1 * | 7/2002 | Webber ........................ 703/22 |
| 6,859,907 B1 * | 2/2005 | McGarry .................... 715/503 |
| 7,236,979 B2 * | 6/2007 | Pratley et al. ............... 707/101 |
| 2002/0143521 A1 * | 10/2002 | Call ............................. 704/1 |
| 2005/0034060 A1 * | 2/2005 | Kotler et al. ................ 715/503 |
| 2005/0091206 A1 * | 4/2005 | Koukerdjinian et al. ........ 707/3 |
| 2005/0149482 A1 * | 7/2005 | Dillon .......................... 707/1 |
| 2005/0268215 A1 * | 12/2005 | Battagin et al. ............. 715/503 |
| 2006/0053363 A1 * | 3/2006 | Bargh et al. ................ 715/503 |
| 2006/0080215 A1 * | 4/2006 | Warsaw et al. ................ 705/37 |
| 2006/0080595 A1 * | 4/2006 | Chavoustie et al. ......... 715/503 |
| 2006/0080596 A1 * | 4/2006 | Bhogal et al. ............... 715/503 |
| 2006/0129913 A1 * | 6/2006 | Vigesaa et al. .............. 715/503 |

OTHER PUBLICATIONS

Jones et al., A User-Centred Approach to Functions in Excel, ACM 2003, pp. 165-176.*
Burnett et al. A Scalable Method for Deductive Generation in the Spreadsheet Paradigm, ACM 2002, pp. 253-284.*

* cited by examiner

*Primary Examiner*—Cong-Lac Huynh
(74) *Attorney, Agent, or Firm*—Vierra Magen Marcus & DeNiro LLP

(57) ABSTRACT

A computer-readable medium having computer-executable modules includes a computer spreadsheet application including a series of cells arranged in addressable rows and columns, and at least one set of linked cells having an embedded function and position relative to other cells in the series of cells, the embedded function being linked to at least one other cell in the series of cells.

20 Claims, 12 Drawing Sheets

PRE-FORMULATED SPREADSHEET CELL GROUPS

BACKGROUND OF THE INVENTION

1. Field of the Invention

The present invention is directed to creating application functionality in a spreadsheet program.

2. Description of the Related Art

Computerized spreadsheets have become widely used for organizing numerical and textual data. These spreadsheet application programs, such as for example Microsoft® Excel, are executed by a processor to provide the user with a graphical presentation of a spreadsheet, and tools for entering information on the spreadsheet. The spreadsheets may consist of rows and columns of individual cells. The columns are organized by letter—Columns A, B, C, etc.—and the rows are organized by number—Rows 1, 2, 3, etc. Each cell is identified by a combination of column letter and row number. Cell "B3," for instance, is in column B and row 3. The user can organize numerical and/or textual data in the cells of the spreadsheet as desired using the computer's graphical user interface, and can format the numerical and/or textual data so as to be recognized as one of a variety of data classes, including text, dates, currency, integers and/or floating point numbers.

The spreadsheet is a rectangular table or grid of information generally including financial information. One of the first commercial uses of computers was in processing payroll and other financial records so programs are designed to generate reports and standard "spreadsheet" format bookkeepers and accountants use. Just as early programming languages were not designed to generate spreadsheet print-outs, programming techniques themselves have evolved to process tables of data more efficiently in the computer itself. A spreadsheet program is designed to perform general computational tasks using special relationships rather than time as a primary organizing principle. In a spreadsheet a set of cells is defined with the special relationship to one another. The cells are functionally equivalent to variables and the sequential programming model. The cells often have a formula, a set of instructions can be used to complete the value of a cell. Formulas can use contents of other cells or external variables such as the current date and time. Spreadsheets usually attempt to automatically update cells when the cells on which they depend have changed. Since spreadsheet cells formulas are generally invertible the technique is of somewhat limited value.

The power of any spreadsheet program is found in the ability to create and functional sheets adapted for specific tasks. Generally, when a user starts the application, they are presented with an open sheet—a sheet of uniformly sized rows and columns devoid of formulas, data or formatting. This blank canvas can be somewhat overwhelming to novice users. Cells are essentially useless without any understanding of the formulas and structure required to organize them into task-based programs.

In order to provide novice and intermediate users with a starting point for creating useful worksheets, application providers generally provide the user with templates of commonly used functional sheets, such as financial planning, checkbook sheets, expense reports and the like. The trouble with templates is that they are essentially a closed environment. This means that any modification of the template can affect its functionality. If a user inserts a row or column, this may create a problem in the functioning of the spreadsheet.

SUMMARY OF THE INVENTION

Modules and data structures are provided to allow one or more groups of cells having associated functions, formulas, and/or layout parameters which may be used to create functional spreadsheet environments in a spreadsheet application. Users can start with a base cell group and add functional groups which are related to the base group.

In one embodiment, the invention includes a computer-readable medium having computer-executable modules. The modules include a computer spreadsheet application including a series of cells arranged in addressable rows and columns, and at least one set of linked cells having an embedded function and position relative to other cells in the series of cells, the embedded function being linked to at least one other cell in the series of cells.

In another embodiment, the invention includes a computer readable medium having a data structure stored thereon. The data structure includes a first group of pre-formatted cells including at least one data or functional component linked to other components in the first group; and a second group of pre-formatted cells including at least one data or functional component linked to other components in the first group.

Another alternative embodiment includes a computer readable medium having computer-executable instructions for performing steps. The steps may comprise: displaying a worksheet having a plurality of cells arranged in rows and columns; displaying a selection interface to a user allowing the user to select a functionally linked group of cells; and responsive to a selection of one of said groups, determining a position for said functionally linked group in the worksheet and inserting the functionally linked group at a predetermined position in the worksheet.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers.

These and other objects and advantages of the present invention will appear more clearly from the following description in which the preferred embodiment of the invention has been set forth in conjunction with the drawings.

DETAILED DESCRIPTION

The invention includes one or more groups of cells having associated functions, formulas, and/or layout parameters which may be used to create functional spreadsheet environments in a spreadsheet application. The cell groups have an understanding of the data context in which they are being used. This context knowledge allows the program to organize the functions and reporting to easily allow the user to enter the information needed. Users can start with a base cell group and add functional groups which are related to the base group. Sets of groups can be provided to replicate template functionality. Individual groups may be locked from editing may be customizable depending on their application.

Financial management is a common application for spreadsheet applications. Bill management is similar to list management, with users lists revolving around recurring bills and contain the following fields: Payee name; Due dates; Bill amounts; Date paid; and Amount paid. In a template, if a user attempted to modify preset column formats, this would compromise the validity of the template. However, using the cell groups of the present invention, for example, if a user selects a "balance" cell grouping, the application of the present invention knows and adds a "credit" and "debit" cell column along with the balance to complete the view. In addition, the user can select an overall set of groups, in the example herein known as a ledger, and then specific cell groupings associated with the view, as well as layout attributes and reporting can be associated with the cell groupings displayed for data entry. The views can also be customized by the user to add or delete pre-defined cell groupings.

Figure 1:
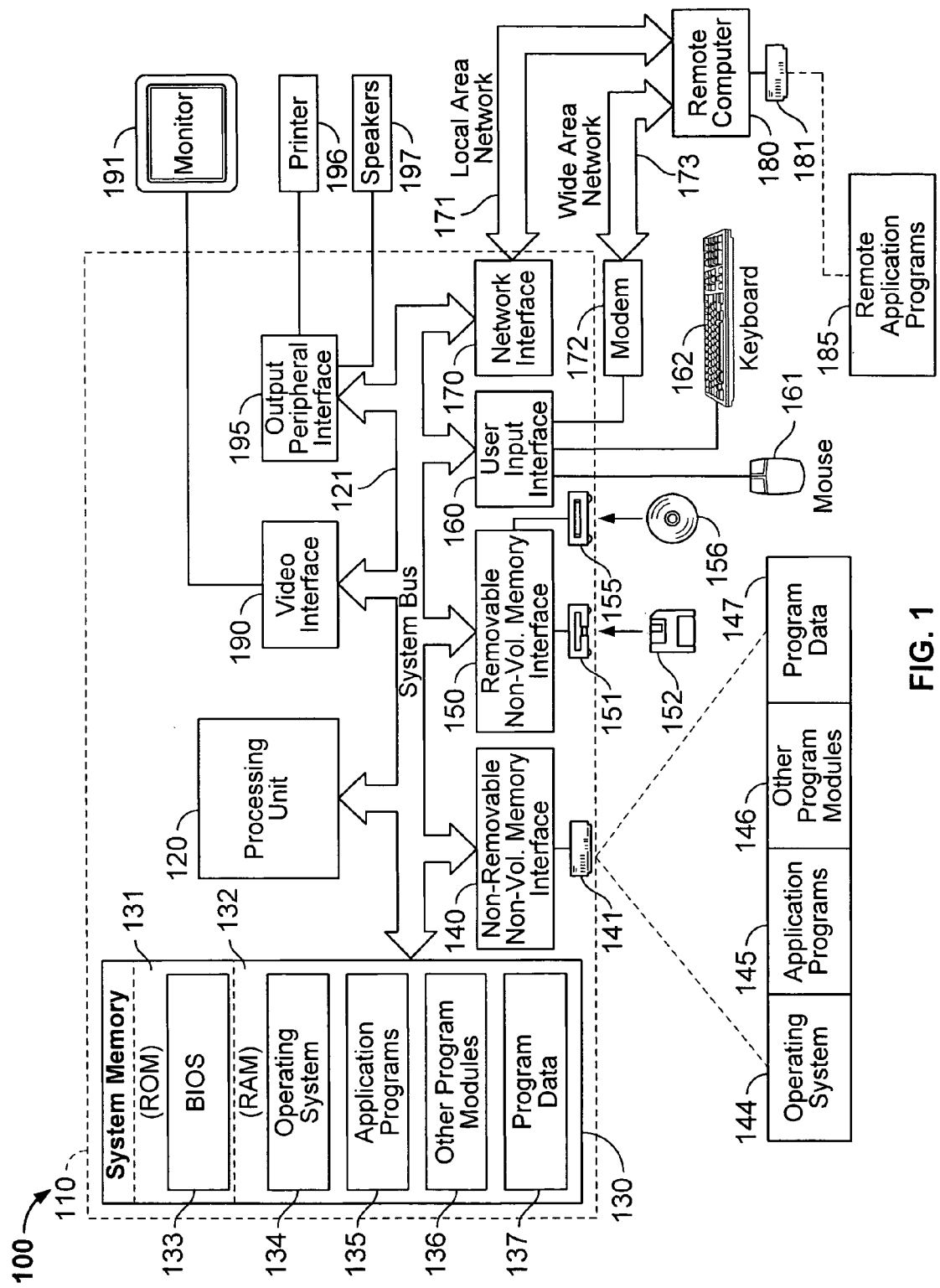
FIG. 1 is an exemplary system hardware configuration suitable for implementing an application in accordance with the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Application programs 135 stored in system memory 130 may include a spreadsheet application program for performing the present invention as described hereinafter. The spreadsheet application program may additionally include all other functionality of conventional spreadsheet application programs such as for example Microsoft® Office Excel from Microsoft Corporation, Lotus® 1-2-3 from Lotus Software, and/or other spreadsheet application program. When the spreadsheet application program is launched, it runs on the operating system 134 while executing on the processing unit 120. An example of an operating system on which spreadsheet application program may run is the Macintosh operating system by Apple Computer, Inc., but the spreadsheet application program may be operate on a variety of operating systems including also the Windows® operating system from Microsoft Corporation, or the Linux operating system from Sun Microsystems, Inc. The spreadsheet application program may be loaded into the memory 130 from the CD-ROM 155, or alternatively, downloaded from over network 171 or 173.

Computing device 100 typically includes at least some form of computer readable media. Computer readable media can be any available media that can be accessed by device 100. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

Figure 2:
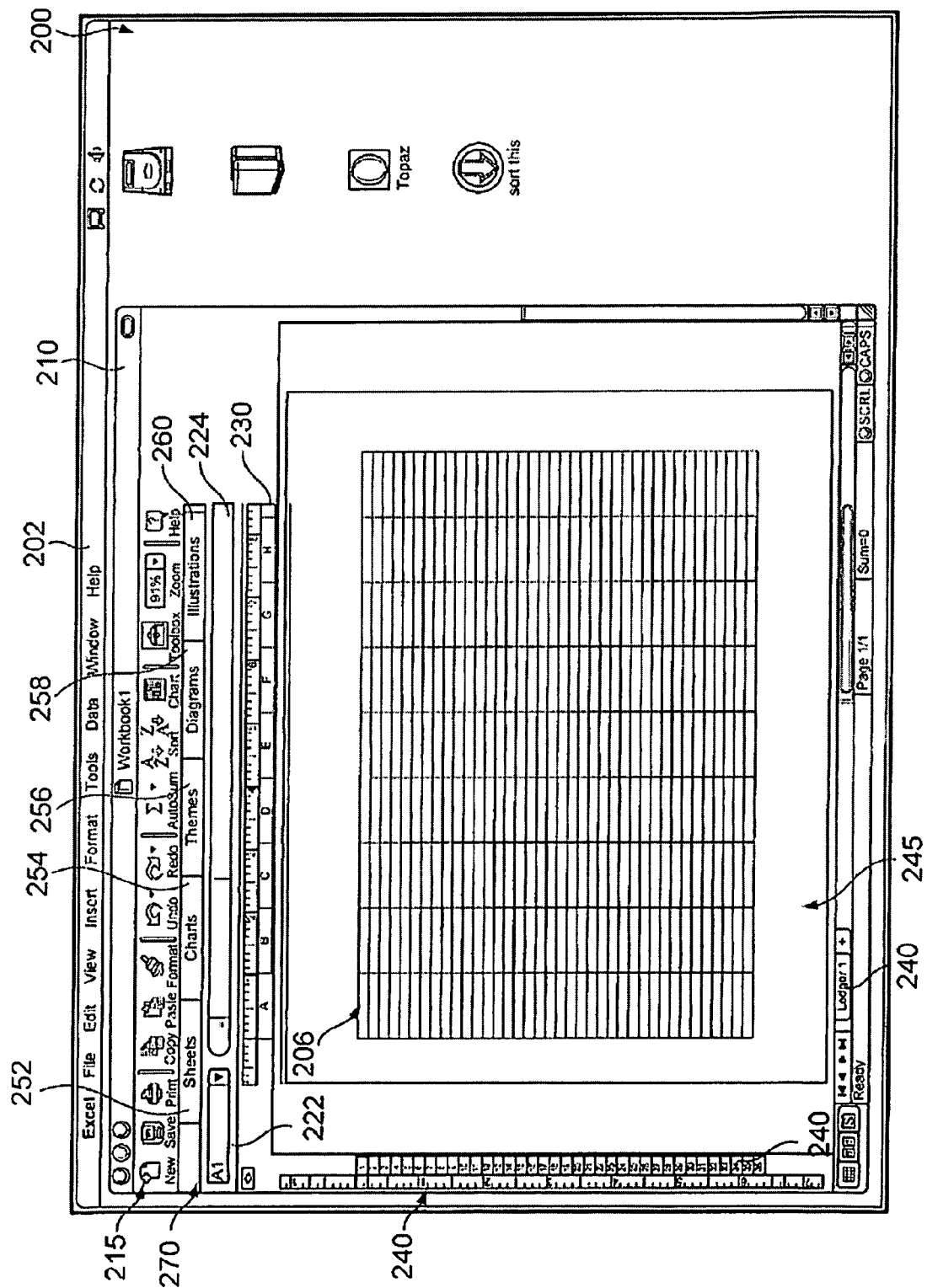
FIG. 2 illustrates a user interface depicting a blank spreadsheet application user interface in accordance with the present invention.

FIG. 2 is a depiction of a user interface for a spreadsheet application set forth in accordance with the present invention. The user interface is provided on computer screen 200 and includes a menu bar 202 having a number of standard commands available to a spreadsheet application such as File, Edit, View, Insert, Format, Tools, Data, Window and Help.

The spreadsheet application program of the present invention may include some or all of the tools, functionality and features of Microsoft® Excel and/or other conventional spreadsheet application programs. Upon launching the spreadsheet application program 135, as shown in FIG. 2, a workbook window 210 which may include one or more spreadsheets 245 is presented. The spreadsheet 245 and tools 215 for entering and managing information on graphical spreadsheet 245 are merely exemplary and may vary in accordance with the particular features of the application program. Spreadsheet 245 may consist of rows and columns of individual cells 206. The columns may be organized by letter—Columns A, B, C, etc.—and the rows may be organized by number—Rows 1, 2, 3, etc., although the column and row designations may be switched or represented otherwise in alternative embodiments. There may be more or less columns and rows than shown in FIG. 2. Each cell 206 may be identified by a combination of column letter and row number. Cell "B3," for instance, may be in column B and row 3.

A spreadsheet window includes a menu bar 215 having a number of standard menu item functions such as New (to create a new spreadsheet), Save (to save a spreadsheet), Print, Copy, Paste, Format, Undo, Redo, Auto send, Sorting, and other functions. Below menu bar 215 is a task selection bar 270 allowing the user to create preformulated task sheets 252, charts 254, themes 256, diagrams 258 and illustrations 260. It will be recognized that the menu entries in the menu bar 215 and task selection bar 270 are merely exemplary. Also shown is a cell selector interface 222 and formula bar 224 are also provided and will be readily recognized by users of applications such as spreadsheets. A column indicator 230 and row indicator 240 are also provided to allow the user to easily assess the position of a cell selector in the spreadsheet.

In accordance with the present invention, the spreadsheet application program includes a preformulated cell groups for simplifying the creation of functional task sheets.

Figure 3:
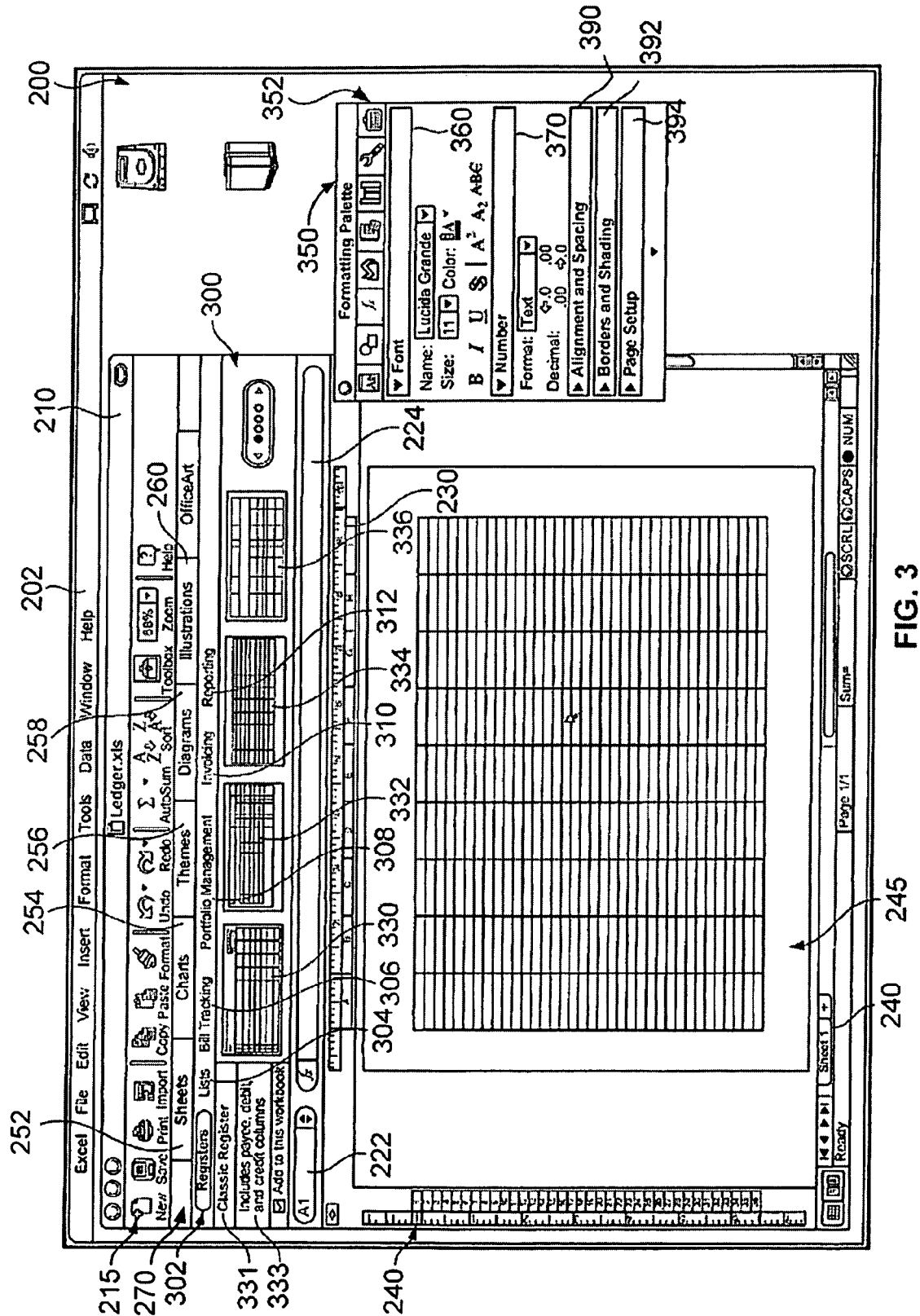
FIG. 3 is a depiction of a user interface displaying a pre-formatted cell group selection template interface.

FIG. 3 shows an interface for selecting a group of preformulated cell groups (PCGs) in accordance with the present invention. As shown in FIG. 3, when a user selects a "sheets" menu item 252 from the task selection bar 270, an elements gallery 300 is displayed. The elements gallery 300 exposes task based spreadsheets 330, 332, 334, 336. Each task based sheet is a group of one or more pre-formulated cell groups organized in a useful task item for the user. The gallery 300 includes a descriptor 331 and short description 333 and each selected or highlighted group of PCGs 330, 332, 334, 336.

Preformulated cell groups are groups of interrelated cells having knowledge in terms of context and relationships about other groups and columns in the cell group. Each preformulated cell group has an identity and associated functions, formulas and/or layout. While some programs like databases can associate types of data to a column, each PCG carries with it an understanding of the data's context. The balance column for example, knows it must carry with it a debit and credit column in order to function. Contextually the PCG is a basic financial management condition.

Menu bar 302 is a list of these groups organized into different categories. In this embodiment, the categories include Registers, Lists, Bill Tracking, Portfolio Management, Invoicing, and Reporting. Selecting one of the items in this group will present a different thumb-nailed version (330, 332, 334, 336) of the task sheet in interface 300. It should be understood that the list of groups presented in FIG. 3 is exemplary. As described herein, the Registers group task sheets are designed to hold a number of transactions, such as checkbook transactions, credit card transactions, and saving registers. Bill tracking sheets help users plan and budget upcoming expenses, and support previous and upcoming dealings. Lists include business transaction lists, checks, payees, customers, services, and goods. Portfolio management sheets include groups for tracking stocks, bonds, and retirement funds. Invoicing sheets include service, retail and wholesale invoice groups that generally fall into two types: ledgers and mailers. Ledgers act as a flat invoice database file, while mailers will extract data from one invoice in a printer friendly format. Finally, Reporting sheets include groups suitable for tracking monthly expenses, categorizing expenses, outstanding invoices, a customer statement and the like. As noted below, each group may be mapped to a corresponding folder in support files (depicted in FIG. 12) and contain a number of sheets, lists or hidden workbooks, as described below.

Also shown in FIG. 3 is formatting pallet 350. The formatting pallet 350 is provided by the spreadsheet application user interface engine and includes a task selection toolbar 352, a font sub menu 360, a number sub menu 370, a Task Sheet 380 sub menu, and an alignment and spacing sub menu 390 (see FIG. 4), borders and shading sub menu 392 and a page set-up sub menu 394. The formatting palette is an interface to allow the user to modify elements of the task sheet and includes a number of sub-menus.

In FIG. 3, the font sub menu 360 and number sub menu 370 are open. A disclosure triangle may be presented next to the header of each menu such that, if clicked, collapses or expands each menu as is well known in the art. The disclosure triangle may be omitted in alternative embodiments. The number sub menu 370 affects the number format for an entire column, while the font sub menu affects the font characteristics for a known column or range.

Figure 4:
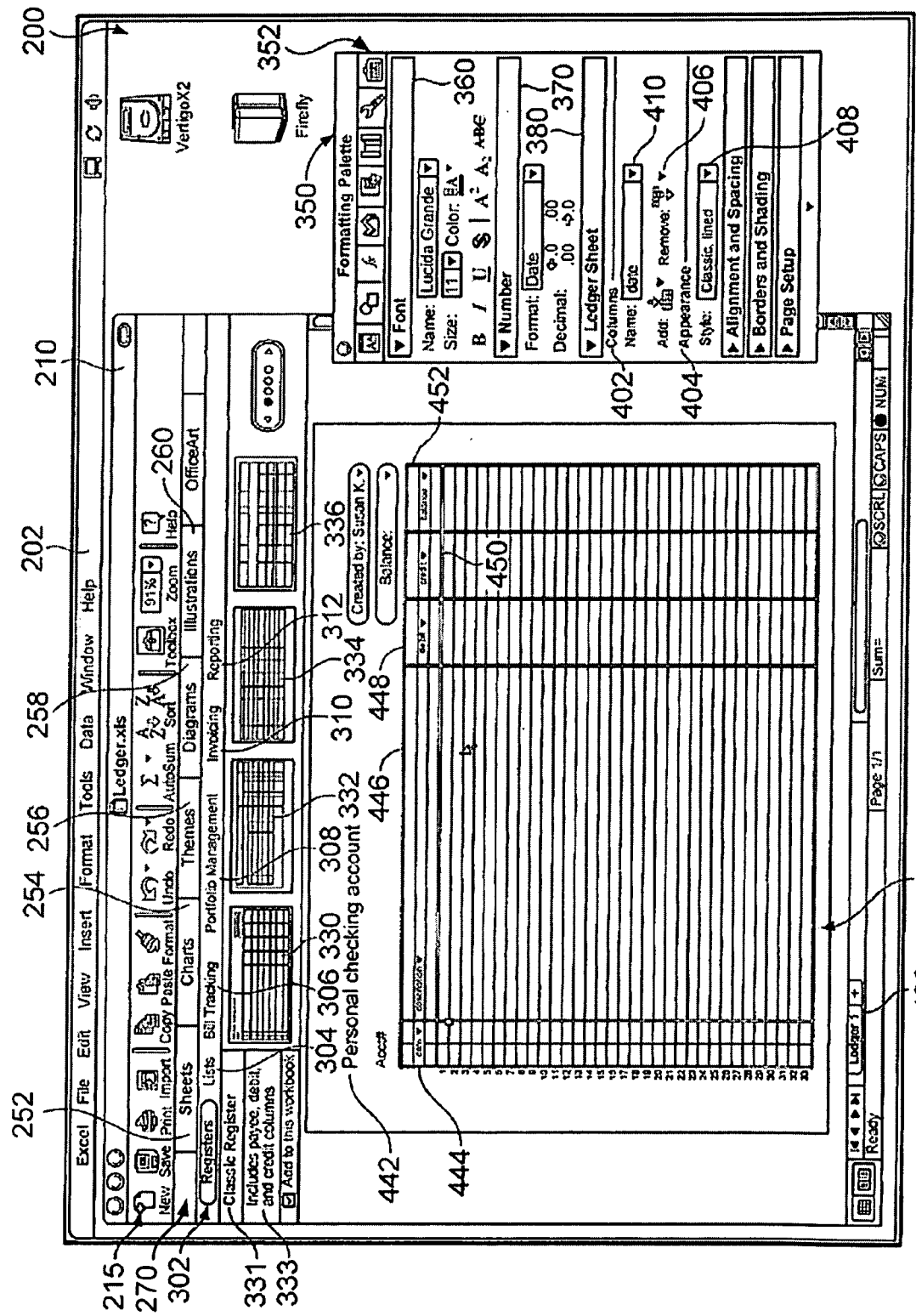
FIG. 4 is a depiction of a user interface after the user has selected a pre-formatted cell group in accordance with the present invention.

In FIG. 3, when a user selects one of the sheet groups 330-336, a display such as that shown in FIG. 4 is generated by the application. The user may select the task sheet such as, by highlighting a thumbnail item and by striking the Enter key on keyboard 162 and/or by "double clicking" on the selected function in the library field thumbnail. "Double clicking" is the known process of two rapid actuations of the pointing device 161 while the graphical pointer on the graphical user interface located over the object being selected. A user may "click and drag" the function from the interface 300. "Click and drag" refers to the known process of selecting an object with the pointing device by actuating the pointing device with the associated graphical pointer on the graphical user interface located over the object to be selected. Then, with the pointing device remaining in the actuated position, moving the selected object to the desired location on the graphical user interface, in this instance, the formula bar 224.

In FIG. 3, once the user has selected, for example, a group entitled "check register" 330, the interface and sheet is presented in the active sheet 245.

FIG. 4 shows a first exemplary task sheet 430. The task sheet shown in FIG. 4 offers a streamlined creation of a financial management spreadsheet built on the needs of the home and small business user. The PCG is a region containing consistent formulas and/or functions organized around the specific task. Typically the PCG will take the form of a column or group of columns and possess a form of relationship intelligence in that they "understand" their relationships to other PCGs and are comprised of several related concepts designed to solve a specific task. It will be understood that PCGs may comprise rows of cells or a range of cells as well, each having a relationship with other column-wise, row-wise or range-wise PCGs. In the example shown in FIG. 4, a checkbook will generally require a date, check number, description debit/credit and balance columns. The PCGs shown in FIG. 4 may be broken down as (1) debit/credit/balance columns; (2) the date column; (3) the description column; (4) the check number column. The debit/credit/balance group consists of three columns because the function integrated into the balance column requires data from the debit and credit columns. Therefore, deletion of one of such columns is prohibited. However, a check number column is not required.

Each PCG maintains a relationship of its rows, range or columns with respect to one another. In the PCG group "checkbook", this includes, for example, the kind of number formatting which should be applied to the date and check number columns, that the description field is a text field, and that adding any credits and subtracting any debits determines the balance. This knowledge allows a programmatically determined formula, hidden to the user, to determine the results of the balance column. In addition, knowing that a workbook has a checkbook, a layout can be predetermined for the user. This layout helps customers create workbooks that are both functional and pleasant looking. The ability to add other PCGs within the context of the workbook allows users to tailor workbooks to meet their own personal needs.

The present invention will be discussed with respect to a personal account checking spreadsheet, it will be recognized however, that the system of the present invention can utilize PCGs beyond merely a financial context. For example, PCGs can be used to create a contact records, lists, and information not related to financial management.

In FIG. 4, the task sheet 430 has a heading 442, and includes a date column 444, description column 446, debit column 448, credit column 450, and balance column 452 designed to act as a user's personal checking account checkbook. It should be noted that the worksheet title has changed at 420 and the worksheet interface 430 has changed as well.

In addition, elements of the interface may be changed to prevent the user from modifying the task sheet in a manner that would destroy the functionality of the group. For example, in FIG. 4 the formula bar 224 is no longer displayed in the interface.

As also shown in FIG. 4, formatting pallet 350 now has a task (or "ledger") sheet menu 380 open. The ledger sheet menu 380 includes a column sub menu 402 and an appearance sub menu 404. The column sub menu 402 allows the user to determine the name 410 of a particular column and includes an add and remove button menu 406, each of which may provide additional menus or interfaces, such as a context sensitive sub-menu shown below, to allow adding or removing PCGs. The appearance sub menu 404 provides a context sensitive sub-menu 408 allowing the user to apply different styling for the task sheet.

Figure 7:
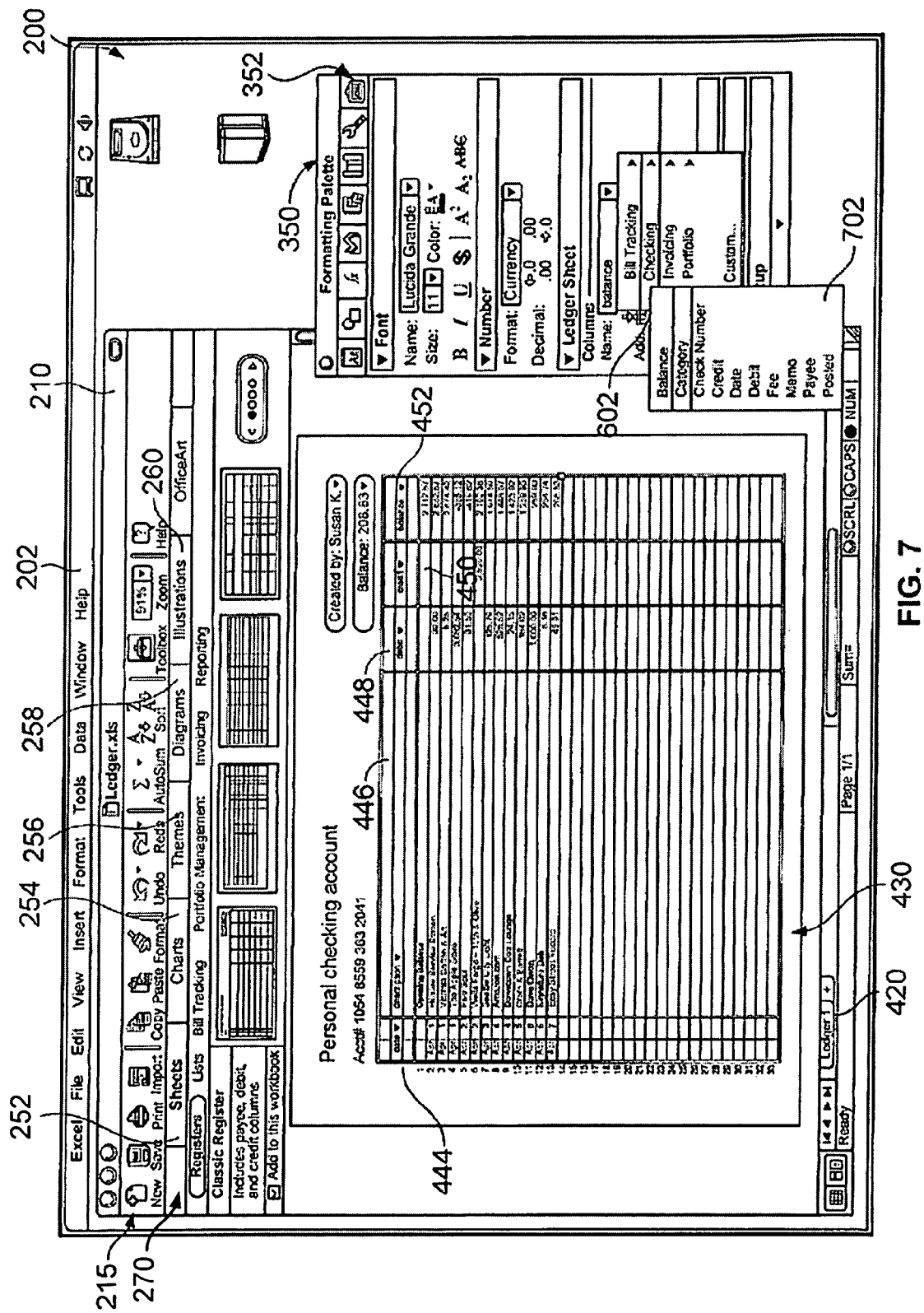
FIG. 7 depicts a contextual menu accessible via the interface for inserting a pre-formatted cell group in accordance with the present invention.

The add button allows users to add preformulated cell groups mapping to basic collections. Each basic collection will offer a PCG supporting text and formulate input. The user will be able to mix and match irrespective of the collection. For example, shown in FIG. 7 is a collection including bill tracking, checking, invoicing and portfolio.

Once the sheet 430 is created, a user will likely want to populate the sheet with data.

Figure 5:
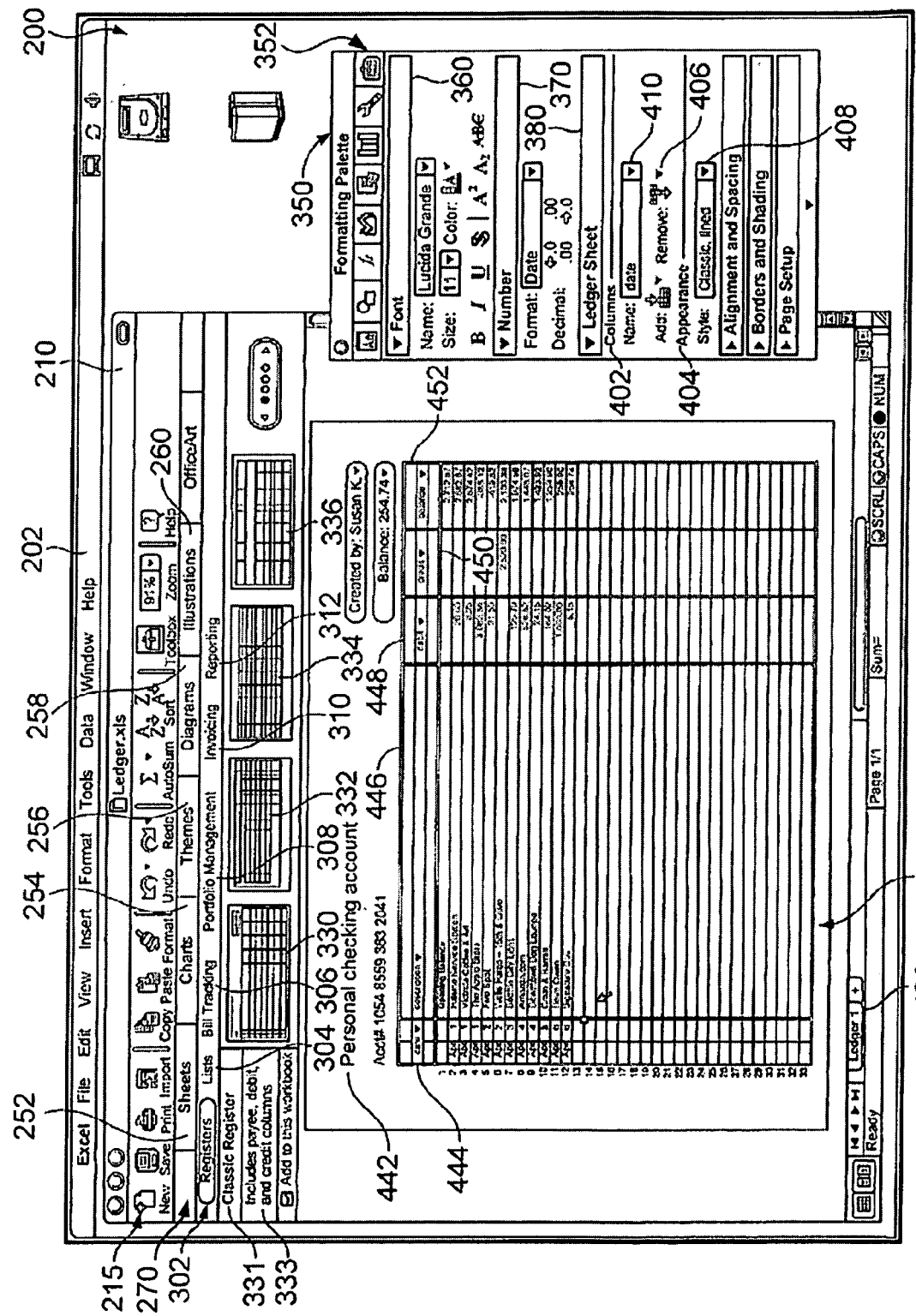
FIG. 5 is a depiction of data populating the pre-formatted cell groups selected in FIG. 4.

FIG. 5 is a depiction of the personal checking account ledger sheet 420 with data populated for the user generating the sheet. Once the data is in place, it will be recognized that the balance column now reflects appropriately added debits and credits in accordance with the functions of this particular sheet.

In one embodiment, the user enters data into the spreadsheet in a manner like that of any spreadsheet by typing information into cells allowing input (such as date, description, debit and credit-balance is calculated from debit and credit data). In a further embodiment of the present invention, PCGs arranged in task sheets can contain formulas that are locked from data entry. In one embodiment, the software spreadsheet application employs a simple worksheet protection to enable locked functionality. If the user attempts to directly edit locked cells, such as the balance column, a warning may be provided to the user. An alternative embodiment allows the user to edit the cells and provide the warning when the cells have been compromised. Instead of allowing users to edit built-in formulas in columns such as balance, the application allows the users to add custom PCGs.

Alternatively, a user may be provided with an interface for importing data into personal checking account spreadsheet. In one embodiment, the import process can be provided by selecting the import option on menu bar 215 which provides an interface for importing comma separated value data to the user.

Selection in a PCG group may be controlled so as to improve task efficiency. When the user selects a cell, the spreadsheet application can select an entire row automatically. Users may be restricted to only be able to select cells containing data or cell in a first blank row (such as row 13 of FIG. 5). Multiple selections can be made as expected by turning the mouse over desired cells. Cells can also be selected by holding down the shift key or command key. The type of data acceptable on any given sheet will be governed by the PCGs use.

PCGs with formulas can be soft locked to prevent accidental overwrite when a user hits a commit key, the interface moves the selection from left to right, top to bottom cycling from the first editable cell to the next. Rows may be selected by clicking any editable cell. Blank rows can be created once the user navigates past the last editable cell containing content. Columns are selected by clicking the column headers allowing the users to easily drag columns to the left and right within the boundaries of the PCG group. By default in one embodiment, column width is managed programmatically, as described below. Manually resized columns will be exempted from such programmatic width calculations. Users can resize width by placing the cursor in between columns, clicking, and dragging to suit their needs.

FIGS. 6-11 illustrate the process of adding a PCG to a task sheet which already includes one or more PCGs. Adding columns and additional PCGs is performed via the formatting pallet control 602.

Figure 6:
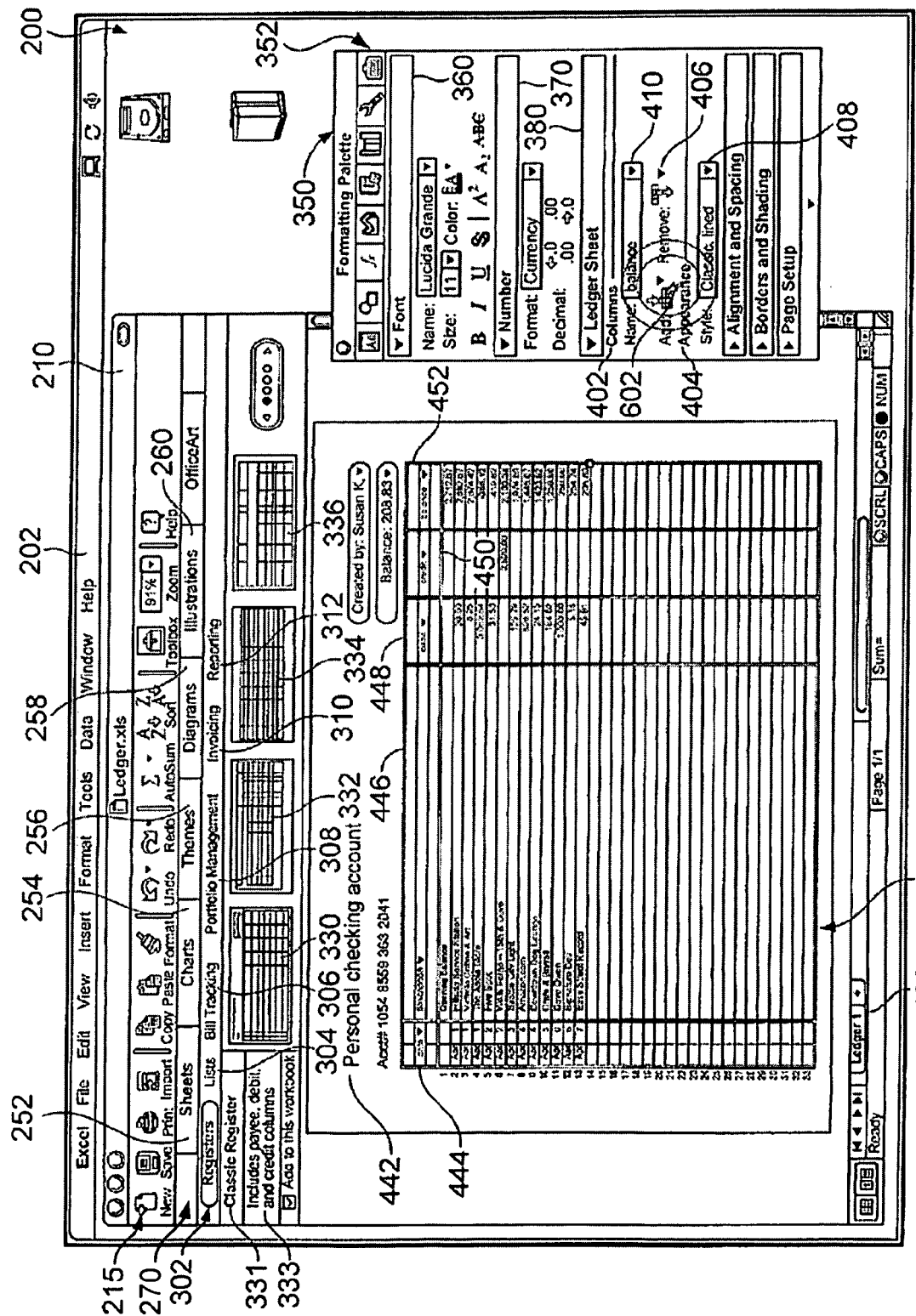
FIG. 6 is a depiction of a user interface allowing a user to add a new pre-formatted cell group to the interface of FIG. 5.

FIG. 6 illustrates the selection of the add control at 602. In FIG. 6, the user makes the selection from the formatting pallet 350 of the add column tool 602. Selection of the add control 602 allows insertion of PCGs in accordance with certain rules of the system. For example, some PCGs require the existence of supporting PCGs in order to function. For example, the balance column cannot work if there are no debit and credit PCGs to support it. If the user attempts to insert a PCG into a task sheet that lacks dependent PCGs, an alert will be provided to the user. The user may remove columns by selecting column header and choosing the new column from the format pallet 350. In some cases, columns are either dependent on or report to other columns. When this is known, the user will not be allowed to delete a column which other PCGs are dependent upon.

FIG. 7 shows the user interface utilized by the user to add a column, in this case a category column. In FIG. 7, a context menu 702 presents the user with a list of available PCGs which can be added to the ledger sheet shown in FIG. 6. These include categories of PCGs for bill tracking, checking, invoicing, and portfolio management, and for the checking PCG, a balance, category, check number, credit, date, debit, fee, memo, payee, and posted PCG. The category PCG includes a number of pre-selected data items which can also be presented in a contextual drop down menu for the user to add data to the column. In FIG. 7, the user has selected the "category" PCG. Again selection of the PCG in menu 702 can be made by any number of well known means.

Figure 8:
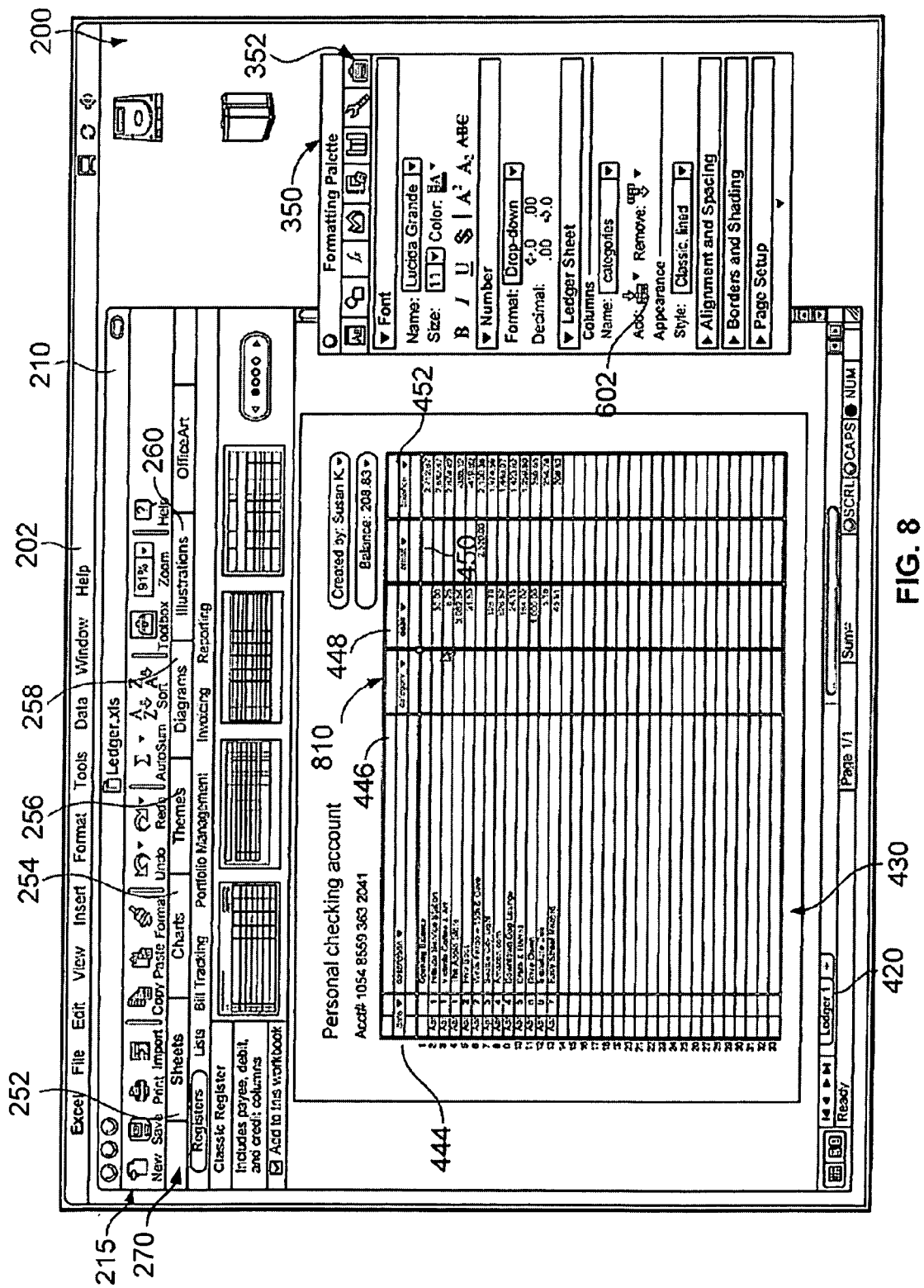
FIG. 8 depicts a user interface wherein a user is inserting data into the newly inserted pre-formatted cell group in accordance with the present invention.

In FIG. 8, as illustrated at 810, the category column has been added to the task sheet 420. In this example, the category column is a PCG having a preferred placement location relative to other PCGs in the active sheet.

Figure 9:
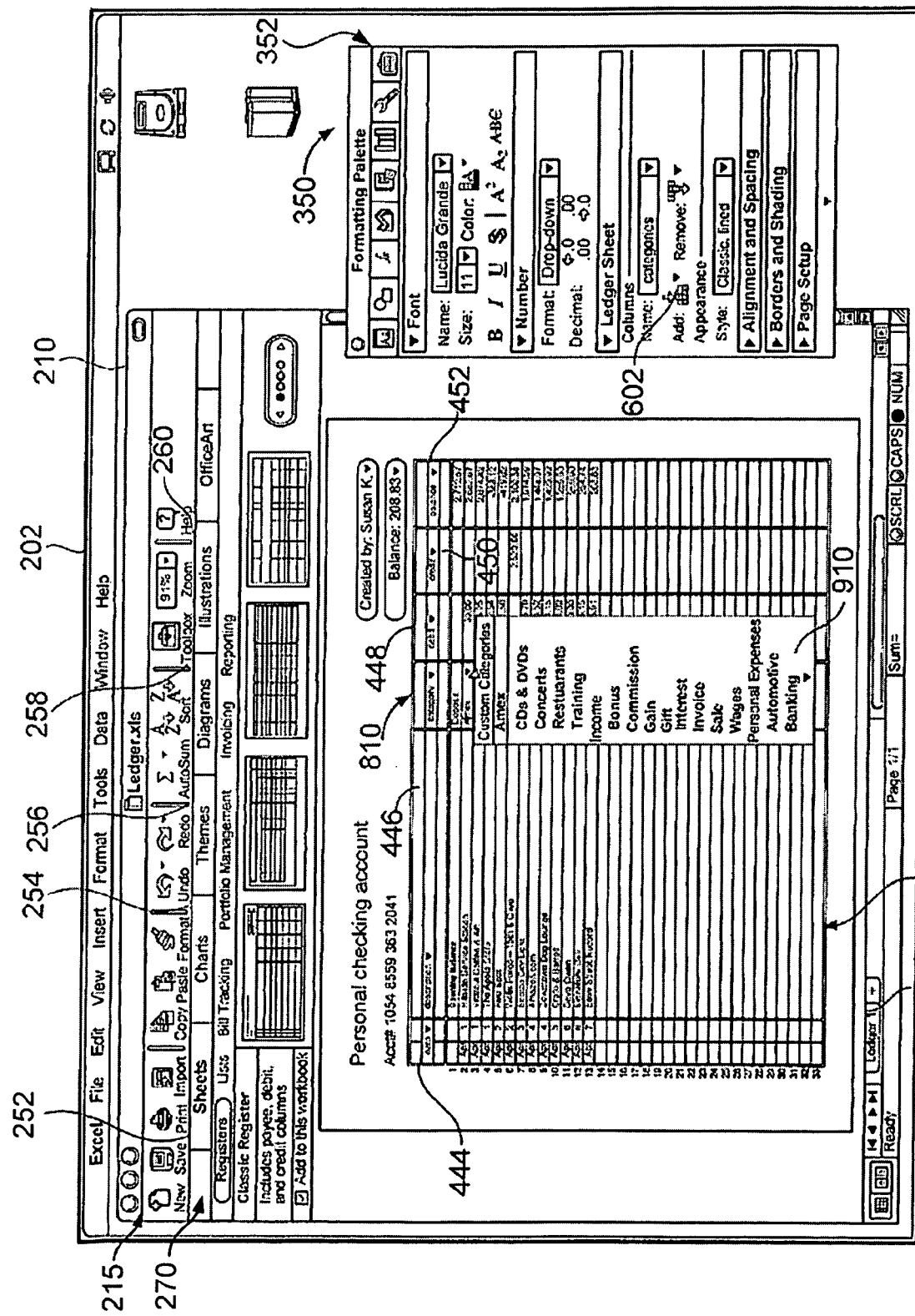
FIG. 9 depicts an additional contextual menu to allow a user to insert data into the inserted pre-formatted cell group in accordance with the present invention.
Figure 10:
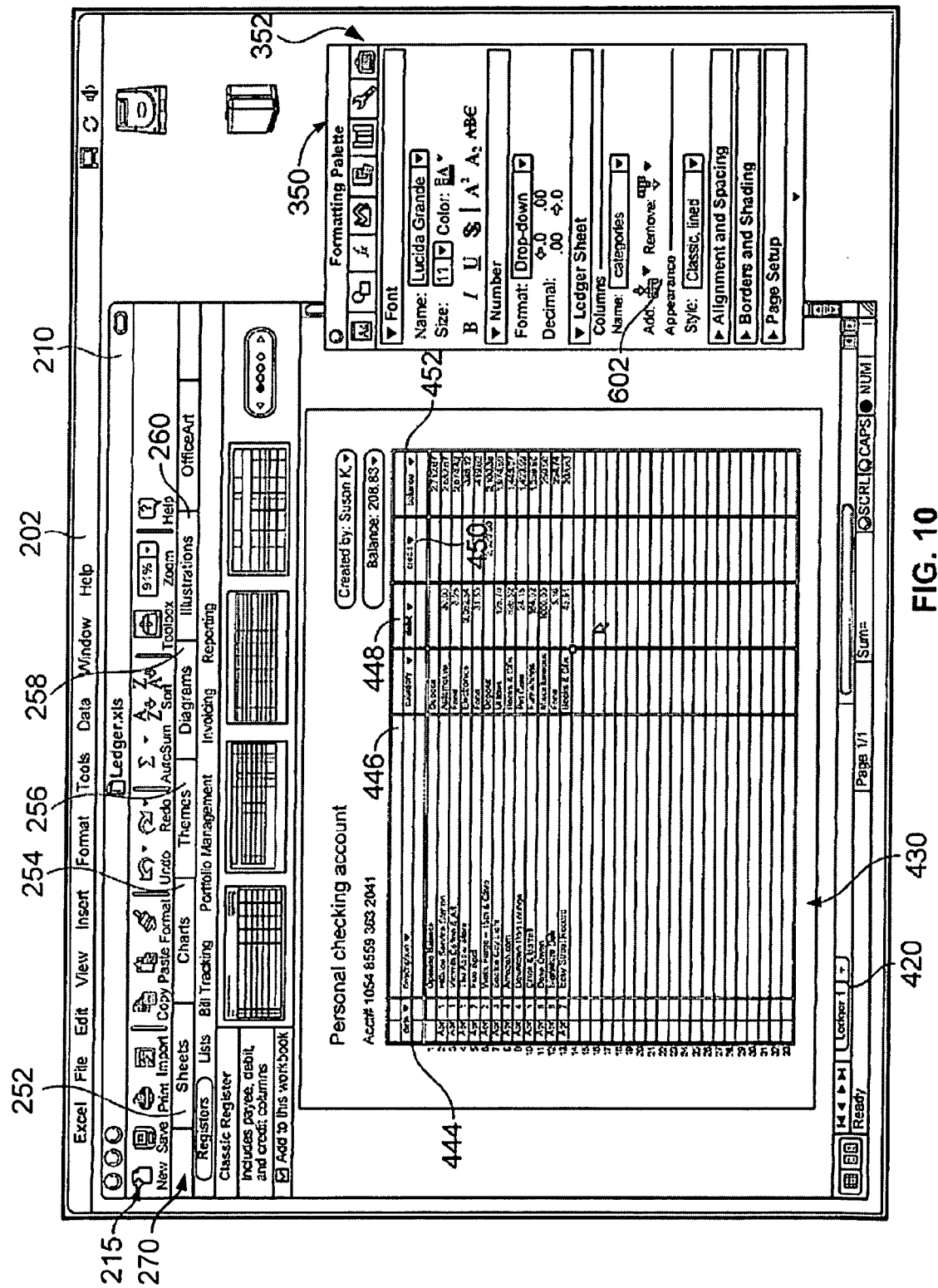
FIG. 10 illustrates a populated pre-formatted cell group in accordance with the present invention.

As shown in FIG. 9, each PCG can itself maintain a datastore of acceptable or allowable values which may be used to populate the cells in its data fields, and may provide an interface allowing the user to populate such fields. For example, the "category" PCG 810 includes a contextual drop down menu 910 allowing the user to add data to the column 810. The contextual drop down menu 910 lists selectable types of data (in this case by categories) including "custom", "income" and "Personal expenses", all supported by the "categories" PCG. The categories "custom categories", "income", and "personal expenses" which are predefined by the application developer. The user utilizes the drop down menu 910 to populate the data in the category column as shown in FIG. 10. Alternatively, the user may use a typeahead manager embedded in the UI control of the spreadsheet application such that, upon selection of the cell and entry of one or more letters, the application presents a first data entry in the PCGs list of acceptable data for the cell and automatically populates the balance of the cell (in, for example, a lighter shaded font indicating a "suggested" entry,) which is completed when the user depresses the enter key.

Figure 11:
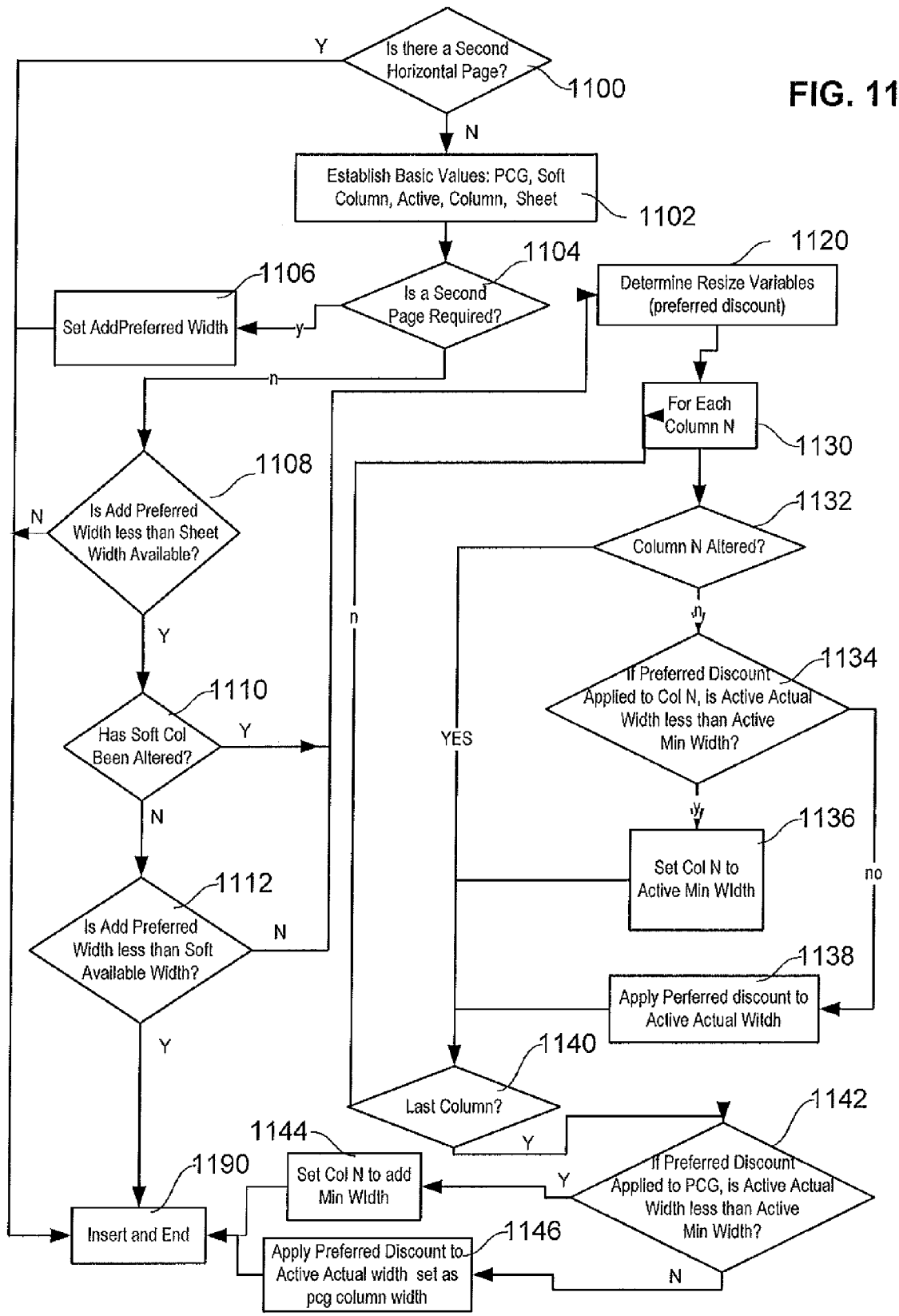
FIG. 11 is a method in accordance with the present invention for determining the width of the group to insert.

FIG. 11 illustrates a method for determining how and where to place an inserted column in accordance with the present invention. By default, each PCG has a defined location relative to other PCGs that is a preferred placement location. This is described for each unique PCG below. Placement is contingent upon knowing what should follow the PCG to be inserted. In a column-wise PCG, this can be, for example, the column to the right. If placement is not available, this application will trace the placement until it finds an existing PCG. If no relative PCG can be found it will insert the PCG in the last column of the sheet.

In general, each PCG group will attempt to maintain page width as columns are added. The spreadsheet application will add new columns and maintain a single page by reducing the width of existing columns. Columns exist in the PCG groups in one of two states: intact or altered. Intact PCGs have never been resized by a user. Altered PCGs have been resized. This distinction is used in resizing columns as described in FIG. 11.

All task sheets may have a designated "soft column". The soft column with a flexible space is the first on the chopping block when columns are added. It is also the last column to be sized. The ledger contains multiple soft columns, which in one embodiment are programmatically identified. PCG groups are not required to contain a soft column, and soft columns are not considered "soft" if a user alters or resizes them. In an alternative embodiment, the first or oldest column is considered "soft".

At step 1100, when a new column or group of columns is to be inserted, the insertion algorithm of FIG. 11 first determines whether or not there is a second horizontal page in the worksheet ("ledger" 420) where the column may be inserted. As will be readily understood, the spreadsheet application tracks page formatting of each worksheet according page settings defined by a user or in this case by the application developer in a formatting style for the task sheets. Settings can include a page style (portrait or landscape), allowed fonts, a total page width, margins, tabs, and the like.

If a second horizontal page already exists, then the column is simply inserted in its desired location and the method ends at step 1190. If no second page exists, then the method establishes certain basic values at step 1102. For each PCG to be inserted at step 1102, a "add preferred width" which is the preferred width of the PCG being inserted and a "add minimum width" which is the minimum width of the PCG being inserted are established. In addition, for the designated soft column or oldest soft column, a minimum width, actual width, and available width are determined. The minimum width is the minimum width of the designated soft column, the actual width is the current width of the designated soft column, and the available width is the difference between the actual width and the minimum width.

An active column is the column of the currently selected cell. For the active column, an actual width and minimum width are determined. For a task sheet, a sheet width, sheet width used, intact minimum width, altered width, sheet width available, and sheet minimum width are determined. The sheet width is the total available width of the active sheet. The sheet width used is the total amount of width consumed by existing columns, intact and altered, inclusive of the actual width of the soft column. The intact minimum width is the sum total of minimum widths of intact PCGs in the active sheet less the active width of the soft column. The altered width is the sum of the width of all altered PCGs in the active sheet less the actual width of the soft column. The sheet width available is the difference between the sheet width and the sheet width used. The minimum width is the sum of the altered width, the intact minimum width and the soft cell minimum width.

Once these values are established, a determination of whether or not the spreadsheet needs to move to a second page is made at step 1104. At step 1104, the algorithm determines whether the sum of all of the minimum widths plus the insert will overflow the page. Essentially, this is a determination of whether the sheet width is less than the sheet minimum width plus the add minimum width of the PCG to be inserted. If so, the PCG column width is set to a preferred width for the PCG at step 1106 the column is inserted at step 1190.

If the PCG column with is not set to a preferred widths, the method proceeds to step 1108 which determines whether the preferred add width of the PCG is less than the sheet width available. If not, a new page is inserted and the method ends. If so, the method determines whether the designated soft column has been altered at step 1110. If the soft column has been altered the method proceeds to step 1120. If the soft column has not been altered, then the method determines at step 1112 whether it is possible to narrow the soft column so as to fit the desired column. This is a determination of whether the preferred add width for the PCG is less than the available width of the soft column at step 1112. If so, the PCG column width is set to the add preferred width and the PCG inserted and the method ends at step 1190. If not, the method proceeds to step 1120.

The foregoing steps have determined that the spreadsheet does not need to push to another page and that the selected PCG could not be added without resizing existing columns. At step 1120, certain resized variables are determined. Specifically, a "preferred discount" is determined by calculating the sheet width used minus the altered width divided by the sheet width used minus the altered width plus the preferred width of the PCG. At step 1130, for each column starting from the first left most column, the columns are crawled to perform the determinations set forth in steps 1132, 1134, 1136 and 1138. For each column N at step 1130, at step 1132 a determination is made as to whether the column has been altered. If the column has been altered, it is a user defined column and the method will attempt not to change the user defined column width (moving to step 1140 for the next column). If the column has not been altered, method determined at step 1134 if the preferred discount is applied to column N, is the active actual width of the active column less than the active minimum width. If so, the column N width is set to the active minimum width at step 1136. If not, step 1138, a preferred discount at step 1120 is applied. The method loops again at step 1140.

Once the last column is reached, at step 1142, the method determines if the preferred discount is applied to the PCG as a whole, the active actual width is less than the active minimum width. If so, it sets the PCG column width to the add minimum width and inserts the column at N. If not, it applies the preferred discount to the actual width set as the PCG column width, and proceeds to insert an N to the PCG at step 1146.

The algorithm described in FIG. 11 applies to any multiple insertions. Multiple columns are considered as one entity when calculating insertion. Add widths would represent the sum of the respective values. Insertion would be unaffected. All PCGs have designated insert points and this applies to single and multiple column scenarios.

Figure 12:
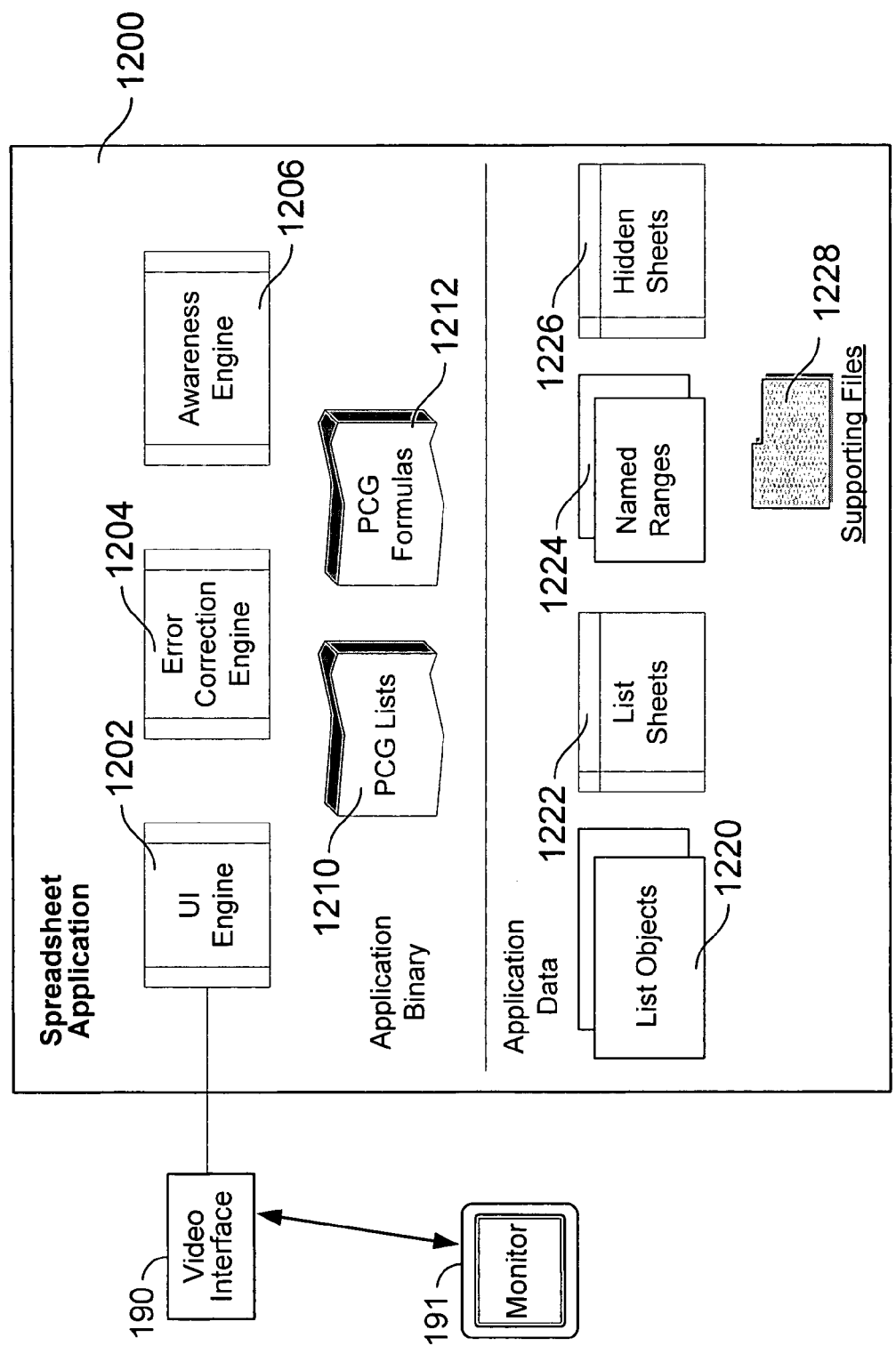
FIG. 12 is a depiction of the application of the present invention.

FIG. 12 illustrates a conceptual depiction of a spreadsheet application 1200 in accordance with the present invention. It will be generally understood to one of average skill in the art that a spreadsheet application program may include one or more application binary files and one or more application data files. The binary files are generally executed by a processing environment such as that shown in FIG. 1 and may access data files at start-up and during run-time. Application 1200 includes a user interface engine 1202, error correction engine 1204, and awareness engine 1206, PCG list 1210 and PCG formulas 1212 in the application binary. Application data files include data stored in the form of list objects 1220, list sheets 1222, and named ranges 1224 and hidden sheets 1226. A set of supporting files 1228 is also provided and stored on for use by the application binary.

In the supporting files, named ranges 1224 are used to call out a column for use by the categories. Control of placement of the columns is performed by the awareness engine 1206 in accordance with the method of FIG. 11. Hidden spreadsheets 1226 store context information for active sheets or task sheets. List objects 1220 and sheets 1222 store the data types and data entry interfaces/restrictions described above. As should be generally understood, a list object is a series of rows that contains related data or a series of rows that one designates to function as a datasheet, and provides features designed to make it easier to manage and analyze groups of related data in a worksheet.

Context and category support is provided for in the PCG lists 1210 and PCG formulas 1212. As noted above, PCG formulas are embedded in the spreadsheet and not generally visible to the users. PCG lists include category support for the exemplary based categories described herein. The PCG formulas 1212 are a series of objects stored in the application itself. The user interface engine 1202 allows creation of the context sensitive menus described above relative to the categories and PCGs. The Awareness engine 1206 dictates context support and generally performs the method of FIG. 11 relative to placement of PCGs within existing sheets. The supporting files 1228 allow users to add and remove files from the support directory. Users may add or remove files and/or folders from the support files depending on whether custom PCGs are created. In one embodiment, users may create custom PCGs such as, for example, by creating a separate task sheet in the same workbook as an existing task sheet with a modified name entry other than the name of the task sheet. Supporting files may include data for the task sheet gallery 300 which is updated when newly added or removed groups or task sheets are provided. Supporting files include information for the task sheets including, for example, the header displayed in a task sheet. Character maximum and style guides will be driven by supporting style information libraries in the supporting files. In another example, the description 333 is pulled from a custom property ("Description") of a supporting file. By default, the spreadsheet application will insert the selected task sheet into the active workbook. Thumbnails for the elements gallery 300 may, for example, be stored as portable network graphics (PNGs) as part of the supporting files In one embodiment of the present invention, a number of PCGs are supported. Tables 1-4 lists PCGs available for financial applications. Table 1 shows exemplary Bill Tracking PCGs:

TABLE 1

Bill Tracking

| Name | Description | Format | Formula | Following Column | Required Columns |
|---|---|---|---|---|---|
| Priority | Marks the priority for the record | Graphic List (Priority) | n/a | Received | — |
| Received (default) | Marks the date the transaction was received | Short Date from the OS | n/a | Payee | — |
| Payee (default) | Name of person or business | Text or List* (Requires Payee PCG) | n/a | Category | — |
| Category (default) | Classifies record n | List (Category) | n/a | Amount Billed | — |
| Billed (default) | Shows amount billed | Currency | n/a | Due Date | Conditional format if "Amount Paid" present |

TABLE 1-continued

Bill Tracking

| Name | Description | Format | Formula | Following Column | Required Columns |
|---|---|---|---|---|---|
| Due (default) | Notes the date the transaction should be completed by | Short Date from the OS | n/a | Paid | — |
| Paid (default) | Flag identifying bill payment | Graphic List (checkbox) | n/a | Date Paid | — |
| Date Paid | Marks the date the transaction was completed | Short Date from the OS | n/a | Amount Paid | — |
| Amount Paid | Shows amount paid | Currency | n/a | Posted | — |
| Posted | Notes that item has posted to financial account | Graphic List (Checkbox) | n/a | None; last column | — |

TABLE 2

Checkbook

| Name | Description | Format | Formula | Following Column | Required Columns |
|---|---|---|---|---|---|
| Priority | Marks the priority for the record | Graphic List (Priority) | n/a | Date | — |
| Date (default) | Date of transaction | Short Date from the OS | n/a | Check Number | — |
| Check Number (default) | Transaction record number | Number, no decimal or separator | n/a | Payee | — |
| Payee (default) | Name of person or business | Text or List* (Requires Payee PCG) | n/a | Category | — |
| Category (default) | Classifies record | List (Category) | n/a | Memo | — |
| Memo | Notes on transaction | Text | n/a | Posted | — |
| Posted | Indicates transaction has posted to bank account | Graphic List (Checkbox) | n/a | Debit | — |
| Debit (default) | Amount of check, ATM, or electronic withdrawal | Currency | n/a | Credit | — |
| Credit (default) | Amount of deposit, interest, or other credit to the account | Currency | n/a | Fee | — |
| Fee | Amount of transaction fee | Currency | n/a | Balance | Credit, Debit |
| Balance | Subtracts debits, adds credits, and applies to previous balance | Currency, negative red and bracketed | (Previous Balance + Credit) − (Debits + Fees) | None; last column | — |

TABLE 3

Invoice

| Name | Description | Format | Formula | Following Column | Required Column |
|---|---|---|---|---|---|
| Priority | Marks the priority for the record | Graphic List (Priority) | n/a | Date | — |
| Date (default) | Date of transaction | Short Date from the OS | n/a | Number | — |
| Number (default) | Transaction record number | General | n/a | Customer | — |
| Customer (default) | Name of person or business to be invoiced | Text or List* (Requires Customer PCG) | n/a | Category | — |
| Category (default) | Classifies record | List (Category) | n/a | Item | — |
| Item (default) | Describes goods being sold | Text or List* (Requires Item PCG) | n/a | Quality | — |
| Quantity | Number of items sold | Number, no decimal places | n/a | Price | — |
| Price | Per item price of goods sold | Currency | n/a | Total Goods | — |
| Total Goods | Total cost of goods sold | Currency | Item × Price | Service | Item, Price |
| Service | Description of services provided | List or Text* (Requires Service PCG) | n/a | Hours | — |
| Hours | Time spent performing service | Number, two decimal places | n/a | Rate | — |
| Rate | Hourly rate for services | Currency | n/a | Total Services | — |
| Total Services | Total cost of services provided | Currency | Hours × Rate | Due Date | Hours, Rate |
| Discounts | Any dollar discount on goods or services | Currency | n/a | Taxes | — |
| Taxes & Fees | Applicable taxes including sales tax, duty fees | Currency | n/a | Total Invoice | — |
| Total Invoice (default) | Total cost of services provided | Currency | ((Total Goods + Total Service) − Discounts) + Taxes & Fees | Due Date | Total Goods or Total Services |
| Due Date (default) | Notes the date the invoice should be paid | Short Date from the OS; conditional formatting turns the date Red if a) due date is in the past and b) Paid is not marked or if Date Paid is filled in | n/a | Mailed | — |
| Mailed | Indicates invoice has been sent to customer | Graphic List (checkbox) | n/a | Paid | — |
| Paid | Flag identifying received payment | Graphic List (checkbox) | n/a | Date Paid | — |
| Date Paid | Marks the date the invoice was paid | Short Date from the OS | n/a | Posted | — |

TABLE 3-continued

Invoice

| Name | Description | Format | Formula | Following Column | Required Column |
|---|---|---|---|---|---|
| Posted | Notes that item has posted to financial account | Graphic List (Checkbox) | n/a | None; last column | — |

TABLE 4

Lists

| Name | Description | Format | Formula | Following Column | Required Columns |
|---|---|---|---|---|---|
| Priority | Marks the priority for the record | Graphic List (Priority) | n/a | First Name | — |
| First | First name | Text | n/a | Last name | — |
| Last | Last name | Text | n/a | Company Name | — |
| Company | Company name | Text | n/a | Payee | — |
| Payee | Merges first, last, and company name | Text | CONCATENATE (First, " ", Last, " ", Company) | Customer | First, Last, Company |
| Customer | Merges first, last, and company name | Text | CONCATENATE (First, " ", Last, " ", Company) | Category | First, Last, Company |
| Category (default) | Classifies record | List (Category) | n/a | Address | — |
| Address | Street address | Text | n/a | City | — |
| City | City | Text | n/a | State | — |
| State | State or province | Text | n/a | Country | — |
| Country | Country | Text | n/a | Postal Code | — |
| Postal | Postal Code | Text | n/a | Work Phone | — |
| Work Phone | Work Phone | Text | n/a | Home Phone | — |
| Home Phone | Home Phone | Text | n/a | E-Mail Address | — |
| E-Mail | E-Mail Address | Text | n/a | Item | — |
| Item | Describes list item | Text | n/a | Service | — |
| Service | Describes type of service | Text | n/a | Quantity | — |
| Quantity | Number of items recorded | Decimal (two places; user can change in Formatting Palette) | n/a | Cost | — |
| Cost | Cost of the recoded item | Currency | n/a | Price | — |
| Price | Price of the recorded item | Currency | n/a | None; Last column | — |

TABLE 5

Portfolio

| Name | Description | Format | Formula | Following Column | Required Columns |
|---|---|---|---|---|---|
| Priority | Marks the priority for the record | Graphic List (Priority) | n/a | Symbol | — |
| Symbol (default) | Stock or fund identifier | Text | n/a | Fund Name | — |
| Fund Name (default) | Full name of stock or fund | Text | n/a | Category | — |
| Category (default) | Classifies record | List (Category) | n/a | Purchase Date | — |
| Purchase Date | Date investment was purchased | Short Date from OS | n/a | Quantity | — |
| Quantity (default) | Amount of shares owned | Number, no decimal, comma separator | n/a | Price | — |
| Price | Per share cost of the investment at time of purchase | Currency, negative red and bracketed | n/a | Last | — |
| Last (default) | Last single share value | Currency, negative red and bracketed | n/a | Change | — |
| Change | Per share change from Price | Currency, negative red and bracketed | Price - Last | Market Value | Last, Price |
| Market Value (default) | Total value of investment | Currency, negative red and bracketed | Last * Quantity | Commission | Last, Quantity |
| Commission | Total fee charged by agent at time of purchase | Currency, negative red and bracketed | n/a | Basic Loss/Gain | — |
| Basic Loss/Gain | Dollar value representing value less price | Currency, negative red and bracketed | (Last × Quantity) − (Price × Quantity) | % Basic Loss/Gain | Last, Price, Quantity |
| % Basic Loss/Gain | Percentage value representing value over price | Percentage, two places | (Last ÷ Price) − 1 | — | Last, Price |

It will be recognized that the groups listed above are exemplary and comprise column wise groups. Additional row or range-wise groups may also be provided.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A computer-readable storage medium having computer-executable modules comprising:

(a) a computer spreadsheet application that generates a spreadsheet document, the spreadsheet document including a series of cells arranged in addressable rows and columns; and (b) at least one set of pre-formulated linked cells having an embedded function and position relative to other cells in the series of cells, the embedded function being linked to at least one other cell in the series of cells, the pre-formulated linked cells having the embedded function before being inserted into a document, each set of pre-formulated linked cells configured to be added to a spreadsheet document.

2. The computer readable storage medium of claim 1 wherein said at least one set of linked cells includes data entry control.

3. The computer readable storage medium of claim 1 further including at least a second set of linked cells having an embedded function and position relative to other cells in the series of cells.

4. The computer readable storage medium of claim 3 wherein said at least second set of linked cells includes an embedded function linked to the at least one set of linked cells.

5. The computer readable storage medium of claim 3 wherein said at least second set of linked cells includes positioning information relative to said at least one set of linked cells.

6. The computer readable storage medium of claim 3 wherein said at least one set and said at least second set of linked cells are protected preventing alteration of the embedded formula.

7. The computer readable storage medium of claim 3 wherein said at least second set of linked cells is protected from deletion based when said embedded formula of said second set is linked to said at least one set of linked cells.

8. The computer readable storage medium of claim 3 wherein said at least second set of linked cells includes context information about said first set of linked cells.

9. The computer readable storage medium of claim 1 wherein said at least one set of linked cells includes formatting information.

10. The computer readable storage medium of claim 1 wherein said at least one set of linked cells includes a defined data set.

11. The computer readable storage medium of claim 10 wherein said defined data set includes a series of selectable data elements.

12. A computer readable storage medium having a data structure stored thereon comprising:
 (a) a first group of pre-formatted cells including at least one data or functional component linked to other components in the first group; and
 (b) a second group of pre-formatted cells including at least one data or functional component linked to other components in the first group,
 the pre-formatted cells including the linked components before being inserted in a spreadsheet by a user,
 each group of pre-formatted cells comprising at least one entire column of cells.

13. The computer readable storage medium of claim 12 wherein said second group of linked cells includes an embedded function linked to said first group of linked cells.

14. The computer readable storage medium of claim 12 wherein said second group of linked cells includes positioning information relative to said first group of linked cells.

15. The computer readable storage medium of claim 12 wherein said at least one set first group and said second group of linked cells are protected from alteration of the functional or data component.

16. The computer readable storage medium of claim 12 wherein said at least second group is protected from deletion based on a link between the functional component and the first group.

17. The computer readable storage medium of claim 12 wherein said at least first group of pre-formatted cells includes formatting information.

18. A computer readable storage medium having computer-executable instructions for performing steps comprising:
 (a) displaying a worksheet having a plurality of cells arranged in rows and columns;
 (b) displaying a selection interface to a user allowing the user to select a functionally linked group of cells; and
 (c) responsive to a selection of one of said groups, determining a position for said functionally linked group in the worksheet and inserting the functionally linked group of cells at a predetermined position in the worksheet.

19. The computer readable storage medium of claim 18 wherein said step (c) includes selecting a preferred position relative to at least one additional functionally linked group of cells.

20. The computer readable storage medium of claim 19 wherein said step (c) includes adjusting the column width of said functionally linked group of cells prior to insertion in the worksheet.

* * * * *